Nov. 6, 1951
G. T. GADDIS
2,574,383
TEMPERATURE CONTROL APPARATUS
Filed Nov. 17, 1947
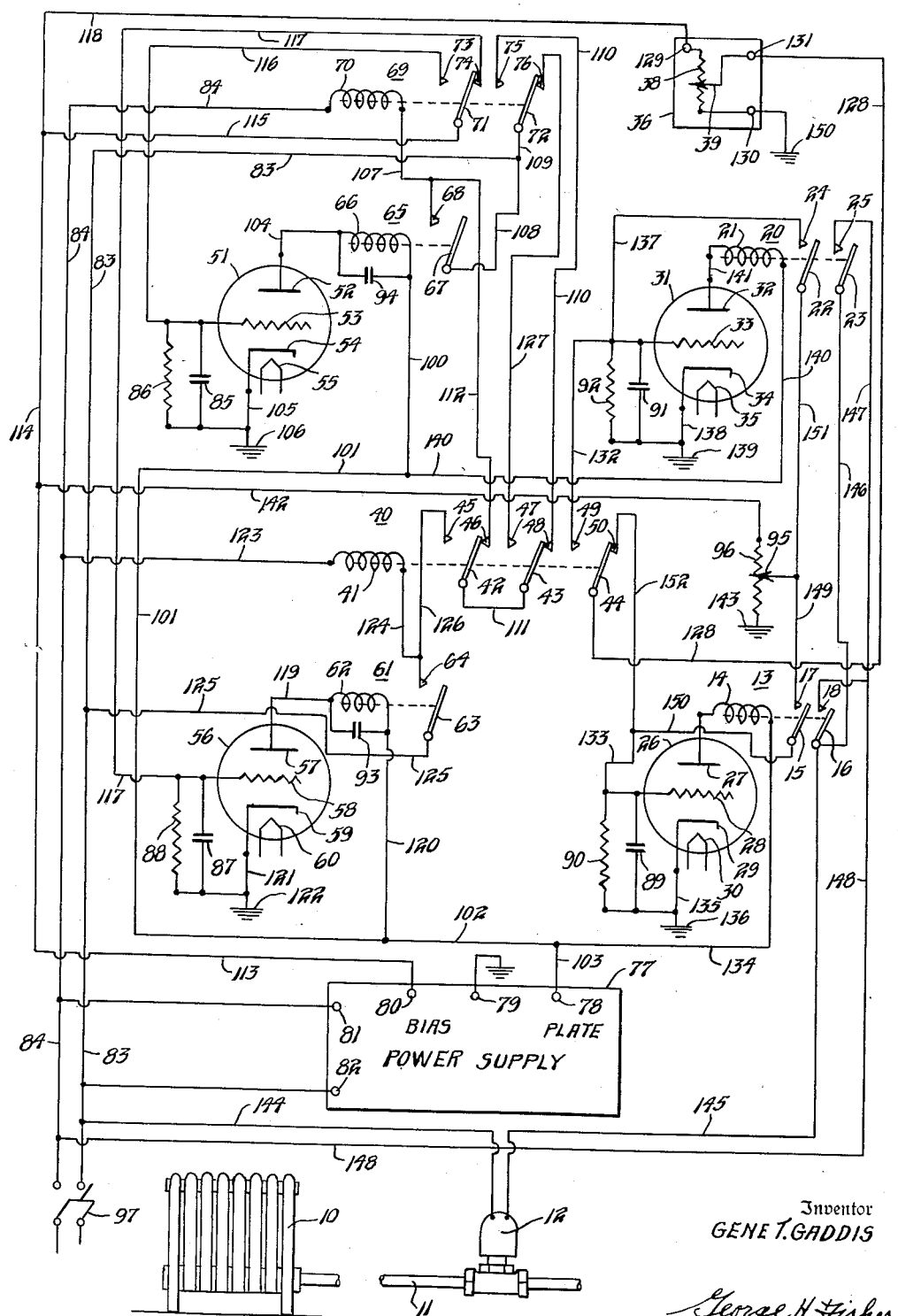
Inventor
GENE T. GADDIS
George H. Fisher
Attorney Patented Nov. 6, 1951

2,574,383

UNITED STATES PATENT OFFICE 2,574,383

TEMPERATURE CONTROL APPARATUS

Gene T. Gaddis, Minneapolis, Minn., assignor to Minneapolis-Honeywell Regulator Company, Minneapolis, Minn., a corporation of Delaware Application November 17, 1947, Serial No. 786,437

11 Claims. (Cl. 250—27)

This invention relates generally to a control apparatus for a heating apparatus and more particularly to an electronic control apparatus. In certain applications it is desirable to operate the heating apparatus according to a predetermined timing cycle and for a certain time in each cycle according to a temperature that is sensed by a temperature sensing element.

In the art of heating, it has been found that large buildings can be efficiently heated by operating the furnaces or radiators according to a predetermined timing cycle. When this timing cycle is used, it is desirable to vary the amount of "on" time during each cycle according to the temperature most effecting the amount of heat required to keep the building comfortable. A measurement of outdoor temperature or weather (including temperature, wind, sun and precipitation) is used to control the amount of heat required.

In the present invention it is proposed to use an electronic control apparatus that will accomplish the desired timing of the heating apparatus. The cycling timing and the "on" timing are both to be accomplished by using resistor and condenser discharge timing for controlling the conductivity of vacuum tubes which have current responsive devices in their plate circuits for switching purposes.

It is therefore an object of the present invention to provide a temperature control apparatus that operates according to a predetermined timing cycle.

A further object of the present invention is to provide a temperature control apparatus which operates according to a predetermined timing cycle with the "on" time controlled by a temperature or weather responsive element.

Another object of the present invention is to provide an electronic temperature control apparatus which operates according to a certain timing cycle with the "on" time controlled by temperature responsive elements.

A still further object of the present invention is to provide an electronic temperature control apparatus whose operation is dependent upon resistor and condenser timing for controlling the timing of the heating apparatus.

Other objects of the present invention will be apparent in the consideration of the accompanying specification, claims and the drawing.

In the single figure of the drawing, the temperature control system of the present invention is shown in schematic form. For purposes of illustration, the apparatus is shown used in connection with a steam radiator which is controlled through appropriate control apparatus by an outdoor temperature or weather responsive element.

Referring specifically to the drawing, the reference numeral 10 represents a steam radiator having a delivery pipe 11. Controlling the amount of steam flowing in the delivery pipe 11 is an electrically operated valve 12. Valve 12 is controlled by a signal from a temperature responsive device 36 acting through vacuum tubes 26 and 31 and relays 13 and 20. A cycling timing function is introduced in the control apparatus by a relay 40 which is controlled by a relay 69 and by vacuum tubes 51 and 56 and their respective anode circuit relays 65 and 61. A power supply 71 supplies operating voltages to the various components and is energized by input power lines 83 and 84.

Specifically the relay 13 consists of a winding 14, switch arms 15 and 16 normally biased upon by means not shown, and switch contacts 17 and 18. The relay 20 consists of a relay winding 21 with switch arms 22 and 23 biased open by means not shown and contacts 24 and 25, adapted to be engaged by arms 22 and 23, respectively. The electron discharge device 26 consists of an anode 27, a control element in the form of a grid 28, a cathode 29, and a cathode heater 30 which is energized by any suitable power source. The electron discharge device 31 consists of an anode control element in the form of a grid, a cathode, and a cathode heater, numbered 32, 33, 34, and 35, respectively. Cathode heater 35 likewise receives its energizing voltage from a suitable source of power not shown. The temperature responsive device 36 consists of a temperature responsive control potentiometer 38 with a wiper 39. The wiper 39 may be positioned in any desired manner by a control which is responsive to temperature or weather.

The cycling timing relay 40 consists of a relay winding 41, switch arms 42, 43 and 44, normally biased into engagement with contacts 46, 48, and 50 respectively by means not shown. Switch contacts 45, 47 and 49 are associated with the switch arms 42, 43 and 44 of the relay when the latter is energized. A further electron discharge device 51 consists of an anode 52, a control element in the form of a grid 53, a cathode 54, and a cathode heater 55, the latter of which is energized by a suitable power source not shown. Electron discharge device 56 consists of an anode 57, a control element in the form of a grid 58, and a cathode 59. A cathode heater 60 of vacuum tube 56 is energized by a suitable power source not shown.

The relay 61 consists of a relay winding 62, and a switch arm 63 biased out of engagement with a contact 64 by means not shown. Relay 65 is identical to the relay 61 and consists of a relay winding 66 and a switch blade 67 biased out of engagement with a contact 68 by means not shown. The relay 69 consists of a relay winding 70, switch arms 71 and 72 biased open by means not shown, and switch contacts 73, 74, 75 and 76.

Power supply 77 has a terminal 78 for plate voltage, a terminal 79 for a ground connection, a terminal 80 for a bias voltage, and terminals 81 and 82 for input power connections. A resistor 85 and a condenser 86 form a time delay network as do a condenser 87 and a resistor 88, a condenser 89 and a resistor 90, and a condenser 91 and a resistor 92. Condensers 93 and 94 are by-pass condensers connected across relay coils 62 and 66, respectively and functioning in the normal manner to smooth the pulsating current flowing through relay coils 62 and 66. The numeral 96 represents a biasing resistor with an associated wiper 95.

In one particular embodiment of my invention, I found that it was possible to obtain a certain desired timing of the apparatus by using resistors equal to 6 megohms for resistors 86, 88, 90 and 92. The condensers 85, 87, 89 and 91 were each 24 microfarads in size. The biasing potentiometer 96 had a resistance of one megohm. The condensers 93 and 94 were each 8 microfarads in size. Two double triode vacuum tubes were used and were of the type known commercially as 7N7's. It will be obvious to anyone skilled in the art that many suitable substitutions can be made on the above sizes and components and, therefore, I do not intend to limit myself to the above stated values and components.

*Operation*

The first section of the apparatus to be described operatively will be the cyclic timing circuit that consists of tubes 51 and 56 and relays 40, 61, 65, and 69. It will be assumed that the apparatus is in the deenergized position as shown. When the line switch 97 is closed, the power source 77 will be energized as will the filaments 55 and 60 of the tubes 51 and 56 respectively. As soon as the cathode 54 of the vacuum tube 51 becomes electron emissive a current conductive path may be established through the tube from the plate voltage terminal 78 of the power supply 77 through conductors 103, 102, 101, and 100, relay winding 66, conductor 104, anode 52, cathode 54, conductor 105, and ground 106 back to the ground terminal 79 of the power supply. As soon as current flows through the last circuit, the relay 65 will be energized and will cause the switch arm 67 to engage contact 68. When switch arm 67 and contact 68 are closed, an energizing circuit is formed for the relay winding 70 of relay 69. This circuit may be traced from the input power line 84 through the relay winding 70, conductor 107, contact 68, switch arm 67, and conductor 108 back to the other input power line 83. When relay 69 becomes energized the switch arm 71 moves into engagement with contact 73 and the switch arm 72 moves into engagement with contact 75. When the switch arm 72 engages the contact 75, a holding circuit for the relay winding 70 is established which is independent of the contact 68 and switch arm 67 of relay 65. This circuit may be traced from the input power line 84 through the relay winding 70, conductor 107, conductor 112, switch contact 46, switch arm 42, conductor 111, switch arm 43, switch contact 48, conductor 110, contact 75, switch arm 72, and conductor 109 back to the other input power line 83. As soon as the switch arm 71 engages contact 73, a biasing circuit is established for the control element 53 of the vacuum tube 51 that may be traced from the bias terminal 80 of the power supply through conductor 113, conductor 114, conductor 115, switch arm 71, contact 73, and conductor 116 to the control element 53 of the tube 51. This bias voltage is sufficient to effectively stop the current flow in the discharge device 51 and deenergize the relay 65 in the plate circuit of the tube 51.

In discussing the operation of the vacuum tube 56, it may be seen that normally, as soon as the cathode 59 is electron emissive, there will be a current path established from the plate terminal 78 of the power supply 77 through conductors 103, 102, and 120, relay winding 62, conductor 119, anode 57, cathode 59, conductor 121, and ground connection 122 back to the ground terminal 79 of the power supply. However, it will be noted, that when the system was first put in operation, that the relay 69 was deenergized and the switch arm 71 was engaged with the switch contact 74. With this in mind, a biasing circuit may be traced from the biasing terminal 80 of the power supply 77 through the conductors 113, 114, and 115, switch arm 71, contact 74, conductor 117, to the grid 58 of tube 56. This biasing voltage is sufficient to maintain the tube cutoff and therefore it is impossible for any plate current to pass through the relay winding 62 to render the same energized. When the switch arm 71 of relay 69 is in engagement with contact 74 so that the bias voltage is connected to the control element of tube 56, the condenser connected between the control element 58 and the cathode 59 will be charged with the same polarity as the voltage at the bias terminal in the power supply. When the relay 69 became energized due to the fact that relay 65 became energized, the switch arm 71 moved out of engagement with contact 74 and this effectively opened the biasing circuit to the tube 56. Since condenser 87 and the parallel resistor 88 are both relatively large they constitute a time delay circuit and the tube 56 will be maintained at cutout for a length of time dependent upon the time delay or time constant of the resistor 88 and condenser 87.

As soon as the biasing voltage on condenser 87 has leaked off sufficiently through resistor 88, the vacuum tube 56 will become conductive sufficiently to cause the energization of relay 61. When relay 61 becomes energized the switch arm 63 moves into engagement with contact 64 to complete an energizing circuit for relay 40 which up to this time has been deenergized. This energizing circuit for relay 40 may be traced from the input power line 84 through conductor 123, relay winding 41, conductor 124, switch contact 64, switch arm 63, and conductor 125 back to the other input power line 83. As soon as relay 40 becomes energized the holding circuit for relay 69 that was completed through switch arm 42, conductor 111, and switch arm 43 will be broken and the relay 69 will be deenergized. As soon as relay 69 becomes deenergized, a holding circuit for relay 40 is established which may be traced from the input power line 84 through conductor 123, relay winding 41, conductors 124, and 126, contact 45, switch arm 42, conductor 111, switch arm 43, contact 47, conductor 127, contact 76, switch arm 72, and conductor 109 back to the other input power line 83.

As soon as relay 69 becomes deenergized, the circuit for the bias voltage from the power supply that was connected to the control element 53 of the tube 51, through the switch arm 71 and contact 73 of the relay 69, will be broken. The switch arm 71 now engages contact 74 and completes the biasing circuit for the control element 58 of the tube 56. Since the condenser 85 is continuously connected between the control element 53 and the cathode 54 of the tube 51, when the bias voltage from the power supply is connected to the control element 53 the condenser 85 will be charged to the same polarity as the bias voltage of the power supply. When the bias voltage is removed due to the deenergization of the relay 69, the condenser 85 will discharge through the resistor 86 and since condenser 85 and resistor 86 are both relatively large the time constant of the parallel circuit is sufficient to maintain the tube 51 cut off for a length of time corresponding to the time that the tube 56 was cut off. As soon as the condenser 85 has discharged sufficiently it will allow the tube 51 to conduct and thereby energize relay 65 which in turn reenergizes relay 69. When relay 69 is reenergized, the holding circuit for relay 40 which was maintained through contact 76 and switch arm 72 is broken and relay 40 will be deenergized. The deenergization of relay 40 starts a second cycle of operation that will be identical to the one described above.

Therefore, it can be seen that a cycling device has been provided which with similar time delay networks on the input of the tubes 51 and 56 act to energize and deenergize relay 40 at a constant rate. This cycling of relay 40 is used in the output control circuit in a manner to be described hereinafter.

Discussing the temperature sensitive portion of the apparatus, consideration will first be given to the temperature sensing device enclosed in the housing 36. The numeral 38 represents the temperature or weather responsive potentiometer which has its wiper 39 positioned in accordance with changes in temperature or weather by any suitable control device. In the form shown in the drawing it is desirable to have the wiper 39 move upward to apply a voltage to the system of such a polarity as to make the voltage on the output between terminals 131 and 130 more negative on a temperature rise. This voltage is supplied from the power supply bias terminal 80 through conductor 113, conductor 114, conductor 118, terminal 129, potentiometer 38, terminal 130, and ground 150 back to the ground terminal 79 of the power supply. It is to be understood that a temperature sensitive resistor could be substituted in the housing 36 for the temperature sensing function of the control apparatus. Using such a resistor would necessitate a connection in housing 36 which would result in the output voltage on terminals 131 and 130 becoming more negative on a temperature rise.

In discussing the operation of the switching devices in the temperature sensitive portion of the apparatus, consideration will first be given to vacuum tube 26. It will be assumed that relay 40 is in the deenergized position with switch arm 44 engaging switch contact 50. With relay 40 deenergized a circuit will be established from the temperature sensitive device 36 at terminal 131 through conductor 128, switch arm 44, switch contact 50, conductor 152, and conductor 133 to the control element 28 of the tube 26. The voltage from the temperature sensitive device 36 is sufficiently negative to maintain the tube 26 effectively cut off to thereby prevent the current flow through the plate circuit. The normal current path may be traced from the plate supply terminal 78 of the power supply through conductor 103, conductor 134, relay winding 14, anode 27, cathode 29, conductor 135, and ground connection 136 back to the ground connection terminal 79 of the power supply. Tube 26 will remain cut off as long as the relay 40 is in the deenergized position.

On the initial half cycle of the cycling relay 40, that is before the relay 40 becomes energized, a plate current path for vacuum tube 31 may be established from the plate supply terminal of the power supply 78 through conductors 103, 102, 101, 140, relay winding 21, conductor 141, anode 32, cathode 34, conductor 138, and ground connection 139 back to the ground terminal 79 of the power supply. It will be noted that with the relay 40 deenergized, or with the switch arm 44 engaging switch contact 50, there is no further voltage supplied to the control element 33 of the tube 31. Since the resistor 92 is connected between the control element 33 and the cathode 34, the control element is effectively at the same potential as the cathode and current will flow in the plate circuit. As soon as plate current starts to flow in the tube 31 the relay 20 will be energized and will move the switch arms 22 and 23 into engagement with their respective switch contacts 24 and 25. When switch arm 22 engages switch contact 24, a biasing voltage is applied to the control element of the tube 31. This biasing voltage may be traced from the bias terminal 80 of the power supply through conductors 113, 142, potentiometer 96, and to ground connection 143 back to the ground terminal 79 of the power supply. The potentiometer wiper 95 picks off the desired bias voltage and feeds the signal through conductor 151, switch arm 22, switch contact 24, and conductor 137, to the control element 33 of the tube 31. Although this voltage is negative, it is not sufficiently negative to decrease the current flow in tube 31 enough to deenergize relay 20. By providing this bias voltage it is possible to give the tube longer life by not allowing it to conduct at saturation whenever the tube is conducting and energizing relay 20 and to reduce the amount of grid swing required to deenergize the plate relay when the temperature sensing device 36 is reconnected to the grid circuit. This might further be explained by noting that there is a differential between the plate current required to energize the plate relay and the plate current required to maintain the relay energized and by shifting the bias on the tube so that the plate current is slightly above that required to maintain the relay energized once the relay becomes energized, it is possible to have a faster and more positive switching action when the input signal on the grid is shifted back to the temperature sensing device 36. When the switch arm 23 engages switch contact 25, the electrically operated valve 12 will be energized. This circuit may be traced from the input power line 84 through conductor 148, conductor 147, switch contact 25, switch arm 23, conductor 146, conductor 145, valve 12, and conductor 144 back to the other input power line 83. When the valve 12 is energized in this manner, steam will be supplied to the radiator 10 through the flowpipe 11 which connects the valve to the radiator.

As soon as the relay 40 becomes energized on the next half cycle of the cycling period, the switch arm 44 will move into engagement with the switch contact 49. When this occurs, the temperature sensitive signal from the temperature sensitive device 36 will be connected to the control element 33 of the tube 31. This circuit may be traced from terminal 131 of the temperature sensitive device 36 through conductor 128, switch arm 44, switch contact 49, and conductor 132, to the control element 33. This voltage will be sufficiently negative to cut the tube 31 off and relay 20 will be deenergized. When the relay 20 is deenergized, the switch contact 23 moves out of engagement with contact 25 and the circuit to the electrically operated valve 12 is opened. This will shut off the steam being supplied to the radiator 10.

Since the condenser 89 is connected between the control element 28 and the cathode 29 of tube 26, the tube will remain cut off for a length of time determined by the discharge time of the condenser 89 discharging through the resistor 90. Since the voltage on condenser 89 is a direct function of the temperature, the time that the tube will remain cut off will be also a function of the temperature. When the condenser 89 has discharged sufficiently to allow the tube 26 to conduct, the relay 15 will be energized and switch arms 15 and 16 will move into engagement with their respective switch contacts 17 and 18. When the switch arm 15 has moved into engagement with the contact 17, a biasing voltage is supplied to the control element 28 from the potentiometer wiper 95 through conductor 149, switch contact 17, switch arm 15, conductor 150, and conductor 133 to the control element 28. As was the case in tube 31, this bias voltage is not sufficient to cause deenergization of the relay 13, and is present to prevent the flowing of unneeded plate current through the tube. When the switch arm 16 moves into engagement with contact 18, a further conductive path is established for the valve 12 and may be traced from the input power line 84 through the conductor 148, switch contact 18, switch arm 16, conductor 145, valve 12, and conductor 144, back to the other input power line 83. Again, valve 12 will be energized and will supply more steam to the radiator 10.

The vacuum tube 26 will remain conductive until such time as relay 40 returns to its deenergized position at the end of the cycle of the cycling portion of the apparatus. When this occurs the negative biasing voltage from the temperature sensitive device 36 will be connected again to the control element 28 of the tube 26 and the tube will be effectively cut off and relay 13 will be deenergized. When relay 13 is deenergized, the energizing circuit for the valve 12 will be broken when contact 18 is moved out of engagement with switch arm 16. When relay 40 became deenergized the switch arm 44 moved out of engagement with switch contact 49 and opened the biasing voltage that was maintaining the tube 31 cut off. Since condenser 91 is connected between the control element 33 and cathode 34 of tube 31, the tube will remain effectively cut off until such time as the condenser 91 can discharge through the resistor 92. As was the case with the condenser 89 connected between the control element 28 and cathode 29 of tube 26, the biasing voltage across condenser 91 is a function of the temperature and therefore the time that the tube is cut off is a function of the temperature too. As soon as the condenser 91 has discharged sufficiently, the tube 31 will become conductive and will again energize relay 20 which in turn will move switch arm 22 and 23 into engagement with their respective contacts as before explained.

The apparatus is now in operation with a particular temperature, and the apparatus is continuously cycling and energizing the valve 12 a length of time dependent upon the amount of bias voltage supplied to the tubes 26 and 31 by the temperature responsive device 36. Should there be a temperature fall, the resistance of the temperature responsive resistor will decrease and the amount of negative bias supplied to the tubes 26 and 31 will be less. From this it will be seen that the bias voltage stored in the condensers 91 and 89 will be less and the discharge time for these condensers through their respective resistors 92 and 90 will be less. With this the tubes 31 and 26 will be energized or current conductive sooner in the timing cycle than before and therefore will energize their respective relays 20 and 13 for a length of time longer than when the temperature was higher. This means that the electrically operated valve 12 will be energized for a longer period when the temperature drops.

On a temperature rise the temperature responsive resistance 37 will increase in resistance and the bias voltage across said resistance will also increase. This increase in bias voltage will also be effecting the charge on the condensers 91 and 89 in a manner opposite to that when there was a temperature drop. This time, with a larger bias voltage on the condensers 91 and 89 the respective tubes 31 and 26 will remain cut off for a period longer than when the temperature was lower. This means that the respective relays 20 and 13 will be energized for a shorter period in the timing cycle than was the case when the temperature was lower. Again, the valve 12 will be energized for a shorter period with a rise in temperature. By providing two discharge devices in the temperature sensitive portion of the apparatus it is possible to obtain a more uniform operation of the relays 13 and 20. This may readily be seen when it is noted that the timing condensers 89 and 91, associated with the input circuits of discharge devices 26 and 31, are normally charged by the bias voltage from terminal 80 of the power supply fed through the temperature sensing device 36. Since the temperature sensing device 36 contains resistance and since the condensers 89 and 91 are quite large, the time constant of the charging circuit may be quite long which necessitates the charging of one input condenser while the other is on its operating cycle. This arrangement then permits the inputs of the two discharge devices to periodically "soak up" the voltage on the output of the temperature sensing device 36.

It may therefore be seen that the present invention has provided an electronically operated apparatus which will energize the heating device according to a predetermined timing cycle, and the length of energization in each cycle is determined by a temperature sensitive element. While the invention has been explained in relation to a heating system, and while it is readily adapted for use there, it will be apparent that it has utility in other forms of condition control. It will also be evident that numerous changes can be made in the details of the shown embodiment of my invention without departing from the spirit of the invention and therefore I intend to limit myself only by the scope of the appended claims.

I claim as my invention:

1. In a temperature control system, temperature sensing means, temperature control means, first and second control energizing means comprising a pair of electron discharge devices, electronically operated switching means alternately connecting one or the other of said first and second control energizing means in circuit to said temperature sensing means, and means including said control energizing means causing cyclic energization of said control means as directed by said temperature sensing means.

2. In a temperature control system, temperature sensing means, control means, first and second control energizing means comprising a pair of electron discharge devices, electronically operated switch means alternately connecting said first and second control energizing means in circuit to said condition sensing means, and means including said energizing means causing energization of said control means according to a predetermined timing cycle as determined by said switch means and for a length of time during each cycle as determined by said temperature sensing means.

3. In a temperature control system, temperature sensing means having a voltage output dependent upon the degree of temperature sensed, control means, first and second control energizing means comprising a pair of electron discharge devices with each having input means requiring a charging period, electronically operated switch means alternately connecting said first and second control energizing means to said temperature sensing means to charge the input of each of said control energizing means when connected to said temperature sensing means, and means including said control energizing means causing cyclic energization of said control means as determined by the operation of said switch means and for a length of time during each cycle which is dependent upon the charge on said input.

4. In combination, a source of power, means indicative of a need for a change in a condition, control means, a pair of electron discharge devices operable from said power source, and each having current controlling means, switching means alternately connecting the current controlling means of each of said discharge devices to said first named means, relay means in circuit with each of said discharge devices and controlled thereby, and means connecting said relay means to control the connection of said source of power to said control means.

5. In combination, a source of power, first and second electron discharge means operable from said source and each having a control electrode, first and second energy storage means, condition sensing means, means cyclically and alternately connecting said sensing means to one or the other of said storage means, means continuously connecting said first and second storage means to the respective control electrodes of said discharge means so that the discharge means will be operative in accordance with the energy stored by said storage means, relay means in circuit with each of said discharge means and responding to the operation thereof, and a single control means connected to be cyclically energized by said relay means when actuated by said discharge means.

6. In combination, a source of power, a first electron discharge device operable from said power source, a second electron discharge device operable from said power source, a cycling switch, condition sensing means, means connecting said cycling switch between said first and second discharge devices and said condition sensing means, and separate electrical storage means connected to each of said discharge devices to maintain said devices non-conducting for a predetermined length of time when said discharge devices are not connected to said condition sensing means, said means with said condition sensing means maintaining said devices non-conducting when connected to said condition sensing means.

7. In a control system for heating means, temperature responsive means having input and output terminals, a source of power, means connecting said source of power to the input terminals of said temperature responsive device, cycling switch means, first and second electron discharge means, first and second energy storage biasing means connected to each of said discharge devices, means including said switch means for alternately connecting the output terminals of said temperature responsive device to said first and second biasing means to supply an increasing bias thereto, and control means energized by said discharge devices.

8. In combination, a source of power, first and second electron discharge devices connected to said source, separate relay means connected in circuit with each of said devices and cyclically operated thereby, to position switch means connected to be controlled by said relay means, condition responsive means having a variable electrical signal output, further electron discharge means connected in energizing relation to said source, means including said switch means connecting said condition responsive means in controlling relation to said further discharge means to cause said further discharge means to be conditioned for operation for periods of time length depending upon the cyclic operation of said switch means and to be operative for a time during each period depending upon the characteristic of said variable electrical signal.

9. In combination, a source of power, a first electron discharge device having an anode, cathode and control element, a first time delay network, first, second, third and fourth relay means, a second electron discharge device having an anode, cathode, and control element, a second time delay network, means connecting said first and second discharge devices to said power source, means connecting said first time delay network between the control element and cathode of said first electron discharge device to control the time of discharge thereof, further means connecting said second time delay network between the control element and cathode of said second electron discharge device to control the time of discharge thereof, a source of negative biasing voltage, means including said second relay means for connecting said biasing voltage to either said first or second time delay networks when said second relay means is energized or deenergized, means connecting said first relay means in circuit with said first discharge device, means connected between said first and second relay means to render said second relay means energized when said first relay means is energized, means connecting said second relay means in circuit with said fourth relay means when said fourth relay means is deenergized to maintain said second relay means energized, means connecting said third relay means in circuit with said second electron discharge device, means interconnecting said third and fourth relay means to render said fourth relay means energized when said third relay means is energized, and further means connecting said fourth relay means in circuit with said second relay means when said second relay means is deenergized to maintain said fourth relay means energized, said fourth relay means being energized and deenergized according to predetermined timing cycle as governed by the timed discharge of said first and second discharge devices.

10. In combination, a source of power, first, second, third and fourth electro-mechanical relay means each having a relay coil and switch contact, electronic timing means connected to said power source and acting with said source to cyclically energize said first and third relay means alternately, means connecting said second and fourth relay means to said power source, means connecting said first and third relay means in an energizing circuit for said second and fourth relay means respectively, means connected in common to said second and fourth relay means to maintain said fourth relay means energized when said second relay means is deenergized, and means connected between said fourth and second relay means to maintain said second relay means energized, said second and fourth relay means being alternately energized and deenergized according to a predetermined timing cycle.

11. In combination, a condition responsive means having an electrical output signal, a pair of electron discharge devices each having an input and an output circuit, a pair of resistor-condenser networks, means connecting one of said pair of resistor-condenser networks to the input circuit of one of said devices and the other of said pair of networks to the input of the other of said devices, relay means connected to the output circuit of each of said devices, cyclically operating switching means directly connecting said condition responsive means alternately to said pair of networks.

GENE T. GADDIS.

REFERENCES CITED

The following references are of record in the file of this patent:

UNITED STATES PATENTS

| Number | Name | Date |
|---|---|---|
| 1,552,321 | Lea | Sept. 1, 1925 |
| 1,822,000 | Young | Sept. 8, 1931 |
| 2,103,481 | Mathes | Dec. 28, 1937 |
| 2,110,172 | Phinney | Mar. 8, 1938 |
| 2,154,492 | Clough | Apr. 18, 1939 |
| 2,189,317 | Koch | Feb. 6, 1940 |
| 2,208,349 | Ulbright | July 16, 1940 |
| 2,225,700 | Laing | Dec. 24, 1940 |
| 2,293,932 | Cooper | Aug. 25, 1942 |
| 2,306,237 | Wolfner | Dec. 22, 1942 |
| 2,349,437 | Keeler | May 23, 1944 |
| 2,419,607 | Terry et al. | Apr. 29, 1947 |